United States Patent [19]
Klug et al.

[11] 4,280,940
[45] Jul. 28, 1981

[54] THERMOPLASTIC COMPOSITION COMPRISING VINYL CHLORIDE POLYMER AND TWO CHLORINATED POLYETHYLENES

[75] Inventors: Helmut Klug, Aystetten; Hans-Helmut Frey, Bad Soden am Tanus, both of Fed. Rep. of Germany

[73] Assignee: Hoechst Aktiengesellschaft, Frankfurt am Main, Fed. Rep. of Germany

[21] Appl. No.: 186,463

[22] Filed: Sep. 12, 1980

[30] Foreign Application Priority Data

Sep. 14, 1979 [DE] Fed. Rep. of Germany ....... 2937178

[51] Int. Cl.³ .................. C08L 23/28; C08L 27/06
[52] U.S. Cl. ..................... 260/23 XA; 260/45.7 P; 260/45.75 W; 260/45.85 R; 525/192; 525/239

[58] Field of Search ................ 525/192, 239; 260/23 XA

[56] References Cited

U.S. PATENT DOCUMENTS

| 3,551,526 | 12/1970 | Trieschmann et al. | 525/192 |
| 3,940,456 | 2/1976 | Frey et al. | 525/192 |
| 4,113,805 | 9/1978 | Frey et al. | 525/192 |

*Primary Examiner*—Carman J. Seccuro
*Attorney, Agent, or Firm*—Curtis, Morris & Safford

[57] ABSTRACT

The present invention relates to transparent thermoplastic compositions on the basis of vinyl chloride polymers which can easily be processed and simultaneously have a good viscosity and good resistance to light and weather. They consist of a mixture of a special vinyl chloride polymer and two different, differently chlorinated chloropolyethylenes.

6 Claims, No Drawings

THERMOPLASTIC COMPOSITION COMPRISING VINYL CHLORIDE POLYMER AND TWO CHLORINATED POLYETHYLENES

The present invention relates to transparent thermoplastic compositions on the basis of vinyl chloride polymers which can easily be processed and simultaneously have a good viscosity and good resistance light and weather.

It is known that polyvinyl chloride and vinyl chloride copolymers may be elastified by an addition of chlorination products of polyolefins obtained by chlorination of polyolefins in aqueous suspension, or in hydrochloric acid, optionally in the presence of silicic acid and silicone oil and having a chlorine content of from 25 to 50% by weight.

Chlorination products having an especially good elastifying effect are obtained by chlorinating a low pressure polyethylene having a density of from 0.940 to 0.955 g/cm$^3$ at temperatures above 120° C. at least during the last chlorination stage. In this process a high degree of "through chlorination" of the polyolefin is obtained being substantial for the elastifying effect. The through chlorination is determined by the following methods:

1. determination of the residue value according to the toluene/acetone method (TAc):

4 Grams of the chloropolyethylene to be tested are refluxed for 1 hour in 100 ml of a mixture of toluene and acetone (1:1). The amount of the insoluble residue consisting of insufficiently chlorinated portions is a measure for the through chlorination of the polyethylene grain. The lower the residue, the more suitable is the chlorination product for elastifying polyvinyl chloride.

2. determination of the swelling value in methylcyclohexane (MCH):

The increase in weight of a sample after a 24-hour storage in methyl-cyclohexane is likewise a measure of the through chlorination of the polyethylene grain. Insufficiently chlorinated portions swell very little. Products having a high swelling value are especially suitable for elastifying PVC.

Chlorinated low pressure polyethylenes having a chlorine content of about 39% by weight which have been prepared under the conditions indicated above have TAc values of less than 40% by weight and MCH values of more than 10% by weight. Mixtures of PVC with such chloropolyethylenes have an excellent impact resistance, but a poor transparency. The transparency of a mixture of 80% by weight of S-PVC of a K value of 70 and 20% by weight of a chlorinated polyethylene having the above indicated properties is about 70%, whereas that of a pure suspension PVC (S-PVC) is about 88 to 90%.

Moreover, it is known from German Patent Specification No. 2,456,278 that thermoplastic compositions, consisting of (a) 95–70% by weight of vinyl chloride polymer and
(b) 5–30% by weight of a chlorinated polyethylene, wherein the chlorinated low pressure polyethylene has a chlorine content of 38 to 42% by weight, a residue value of 55–70% by weight and a swelling value of less than 1% by weight and which has been obtained from a low pressure polyethylene of a density between 0.955 and 0.965 g/cm$^3$, a melt index MFI 190/5 (DIN 53 735) of from 20 to 65% g/10 min by chlorination in water or in hydrochloric acid, optionally in the presence of from 0 to 2% by weight of silicic acid and of from 0 to 1% by weight of silicone oil, each time calculated on the low pressure polyethylene, at temperatures between 50° and 120° C., with at least the last 10% of chlorine being introduced at temperatures between 110° and 120° C., having a good transparency and a sufficient impact resistance and fastness to weathering for being used as transparent walls, corrugated panels and profiles. In this process a high toughness is obtained especially when using relatively high-molecular vinyl chloride polymers, for example S-PVC with a K value of 70. Such a high-molecular PVC, however, can only be processed with difficulties, since, due to the high melt viscosity, high temperatures must be used which during the extrusion can easily lead to burns or a checkered surface of the extruded product. When using PVC with lower K value, the processability is improved, but the toughness is reduced simultaneously.

Thus, it was the aim of the present invention to develop thermoplastic compositions on the basis of vinyl chloride polymers, having the good transparency, toughness and fastness to weathering of the masses according to German Patent Specification No. 2,456,278 and additionally improved flowing properties and processibility.

This has been achieved according to the present invention by the addition of two different chloropolyethylenes to vinyl chloride polymers.

Subject of the invention is, therefore, a transparent, thermoplastic composition which is easily to be processed and which has good toughness and good resistance to atmospheric corrosion, consisting essentially of (A) 95–80, preferably 92–86% by weight of vinyl chloride polymer and (B) 5–20, preferably 8–14% by weight of chlorinated polyethylenes, each time calculated on the thermoplastic composition, wherein component (A) is a vinyl chloride polymer with a K value of from 55–65, preferably from 58–63 and component B is a mixture of (B$_1$) 2.5–15, preferably 4–10 parts by weight of a chlorinated low pressure polyethylene, having a chlorine content of from 37–42, preferably from 38–40% by weight, a residue value of 0–30, preferably 0–25% (measured by extraction with toluene/acetone 1:1) and a swelling value of from 10–70, preferably from 20–50% (measured in methyl cyclohexane) and which has been prepared by chlorination of a low pressure polyethylene of a density of from 0.940 to 0.955 g/cm$^3$ and a melt flow index MFI 190/5 of from 0.1 to 5, preferably 0.3 to 3.5 g/10 min in suspension in water or in 10–35% hydrochloric acid in the presence of 0–2% by weight of silicic acid and 0–1% by weight of silicone oil, each time calculated on the polyethylene used, at temperatures between 50° and 130° C., while incorporating at least 10% of chlorine at temperatures between 50° and 120° C. and (B$_2$) 2.5–15, preferably 4–10 parts by weight of a chlorinated low pressure polyethylene with a chlorine content of from 37 to 42, preferably 39–41% by weight, a residue value of from 50 to 70, preferably 50–60% and a swelling value below 1% and which has been prepared from a low pressure polyethylene with a density between 0.955 and 0.965 g/cm$^3$ and a melt flow index MFI 190/5 of from 20 to 65, preferably 40–55 g/10 min by chlorination in suspension in water or in 10–35% hydrochloric acid in the presence of from 0 to 2% by weight of silicic acid and 0–1% by weight of silicone oil, each time calculated on the polyethylene used, at temperatures between 50° and 120° C., while introducing at least the last 10% of chlorine at a temperature of from 110° to 120° C.

The thermoplastic composition according to the invention consists of from 95 to 80% by weight, preferably 92 to 86% by weight of polyvinyl chloride or a copolymer of vinyl chloride with further comonomers. Examples of comonomers are, for example, olefins, such as ethylene or propylene; vinyl esters of straight chain or branched carboxylic acids having of from 2 to 20, preferably of from 2 to 4 carbon atoms, for example, vinyl acetate, propionate, butyrate, -2-ethyl hexoate, stearate or vinylisotridecanoic acid ester; vinyl halides, for example, vinyl fluoride, vinylidene fluoride or vinylidene chloride; vinyl ethers, for example, vinylmethyl ether; vinyl pyridine; unsaturated acids, for example, maleic, fumaric, acrylic, methacrylic acid and their mono- or diesters with mono- or dialcohols having of from 1 to 10 carbon atoms; maleic anhydride, maleic acid imide as well as its N-substitution products with aromatic, cycloaliphatic as well as optionally branched aliphatic substituents; acrylonitrile, styrene. Mixtures of these monomers may also be used.

The quantity of comonomer units in the VC copolymer may be up to 20% by weight, preferably of from 1 to 5% by weight.

Suspension PVC or mass PVC are preferably used.

The remaining 5 to 20% by weight, preferably 8 to 14% by weight of the thermoplastic composition consist of the chlorinated low pressure polyethylenes to be used according to the invention, which are fine grained and can readily be mixed homogeneously with vinyl chloride polymer powders.

The chlorinated low-pressure polyethylenes used according to the invention are prepared by chlorinating finely divided low pressure polyethylene, which may optionally be tempered or pre-sintered at a temperature of 100° C. to the crystallite melting point of the respective polyethylene for a period of preferably 5 to 300 minutes, in water or in aqueous hydrochloric acid having a concentration of from 10 to 35%, preferably from 15 to 25% (the hydrochloric acid medium being used advantageously in the 3- to 30-fold quantity of the polyethylene).

Chlorination is advantageously carried out in the following manner: it is started, for example, at a temperature in the range of from 50° to 100° C., preferably of from 70° to 90° C., continued while continuously increasing the temperature and terminated at a temperature in the range of from about 110° to 120° C., or from 120° to 130° C. It is likewise possible to perform chlorination in two steps, i.e., to start at a temperature of from 50° to 100° C., preferably of from 70° to 90° C., to increase the temperature while stopping the chlorine supply to 110° to 120° C. for component $B_2$, or to 120° to 130° C. for component $B_1$ and to continue chlorination until it is terminated or to carry out the whole chlorination at a temperature of from 110° to 120° C. (component $B_2$) or from 120° to 130° (component $B_1$).

In these processes it is only essential, as already mentioned above, that at least the last 10% by weight of chlorine are introduced at a temperature of from 110° to 120° C. or 120°–130° C.

By silicic acid which may be present in the chlorination process as agglomeration inhibitor, there are to be understood the various hydrous or anhydrous types of finely porous silicon dioxide preferably having a large surface, the inner surface whereof should be suitable in the range of from 50 to 400 cm²/g, preferably of from 150 to 300 cm²/g (according to BET). The average particle size of the silicic acid generally is in the range of from 1 to 50 μm.

The organo-silicon compounds or silicone oils are liquid polysiloxanes consisting of the recurring unit

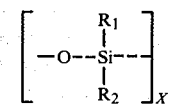

in which $R_1$ and $R_2$ each represents an alkyl radical preferably having from 1 to 12 carbon atoms, an aryl radical, having preferably of from 6 to 10 carbon atoms or an aralkyl radical having from 7 to 12 atoms and X is an integer of from 10 to 10,000, preferably from 100 to 1,000. Compounds of the dimethyl polysiloxane series have proved to be especially efficient. There may further be mentioned, by way of example, diethyl, dipropyl, methylethyl, dioctyl, dihexyl, methylpropyl, dibutyl and didodecyl-polysiloxanes. The viscosity advantageously is in the range of from 1,000 to 500,000 centistokes and especially of from 1,000 to 60,000 centistokes.

The antiagglomeration effect of hydrochloric acid is improved by adding simultaneously silicic acid and silicone oil. Such an addition is therefore preferred. In general 0.1 to 2% by weight, preferably of from 0.1 to 1% by weight of silicic acid in combination with 0.001 to 1.0, preferably of from 0.02 to 0.7% by weight of silicone oil, each time calculated on the low-pressure polyethylene used, are sufficient. The maximum amount of silicic acid and silicone oil is not strictly limited, in some cases higher amounts may also be used, whereby the agglomeration inhibition is further improved, but then certain disadvantages for the blend with PVC must be taken into consideration.

The silicic acid component and the polysiloxane which may be possibly pre-mixed are expendiently added prior to or at the beginning of the chlorination. According to another method of operating the silicic acid is first added alone and the silicone oil is then admixed in the course of the chlorination. A possible slight agglomeration can be counter-acted at least partially by the later addition of silicone, even if performed just before drying. It is also possible, of course, to add the intended amount of silicone oil in portions during some or all process steps.

The thermoplastic composition according to the invention may contain additionally known processing additives such as heat or light stabilizers, UV absorbers, lubricants, plasticizers dyestuffs, pigments, as well as antistatic agents.

It has been found that the stabilization of the compositions according to the invention does not only influence the stability to heat and light, but also transparency and processibility. A very good transparency is obtained with the usual tin stabilizers, such as mono- or dialkyl tin compounds having from 1 to 10 carbon atoms in the alkyl radical, wherein the remaining valencies of the tin are saturated by oxygen and/or sulfur atoms, such as dibutyl tin bis-thioglycolic acid octyl ester, but the stability to light in the case of sulfur-containing compounds is not sufficient for outdoor use.

Light stability cannot be improved by addition of an UV absorber or light stabilizer either whereas in the case of sulfur-containing compounds the rheological properties are impaired.

Usual Ba/Cd-stabilizers, such as complex Ba/Cd-laurate, reduce the transparency.

The best results were obtained with 2–8% by weight, preferably 4–7% by weight, relative to the thermoplastic composition of a mixture of stabilizers, consisting of
(a) 0.75–2 parts by weight of a complex Ba/Cd-benzoate,
(b) 0–2 parts by weight of a complex Ba/Cd-soap of a fatty acid with 12–18 carbon atoms,
(c) 0.3–1 part by weight of a phenylalkyl phosphite with 8–12 carbon atoms in the alkyl group
(d) 0.5–3 parts by weight of an epoxidized fat, for example epoxidizing linseed oil or epoxidized soybean-oil
(e) 0–1 part by weight of an UV-absorber and
(f) 0.5–1.0 part by weight of a lubricant, for example paraffin oil.

This stabilization is therefore preferred. Complex Ba/Cd compounds are commercial stabilizers, which, in addition to the Ba/Cd-salts, also contain different amounts of polyols, such as trimethylol propane or pentaerythritol and antioxidants, for example bisphenol A. The complex compounds contain about 80% of Ba/Cd-compounds.

Examples of component (b) of the mixture of stabilizers mentioned above are, for example, the known complex Ba/Cd laurates and stearates. Suitable components (c) are diphenylalkyl phosphites as well as phenyldialkyl phosphites, such as diphenyloctyl phosphite or phenyldidecyl phosphite. As UV absorbers and lubricants for the mixtures of stabilizers specified above may be indicated the following compounds which can also be used for other stabilizer systems.

For improving the light stability substances absorbing the UV light, for example, benzophenone or benztriazole derivatives, for example, 2-(2'-hydroxy-5' methylphenyl)-benztriazole or 2-(hydroxy-3'-tertiarybutyl-5'-methylphenyl)-5-chloro-benztriazole may be added to the mixtures.

As lubricants there may be used one or several higher aliphatic carboxylic acids and hydroxycarboxylic acids as well as their esters and amides, for example, stearic acid, montanic acid, glycerin monooleate, bis-stearyl or bis-palmitoyl ethylenediamine, montanic acid esters of ethanediol or 1,3-butanediol, fatty alcohols having more than 10 carbon atoms, as well as their ethers, low molecular weight polyolefins, paraffin oils or hard paraffins, in an amount of from advantageously 0.1 to 6% by weight, calculated on the total mixture.

Suitable pigments, for example, are titanium dioxide, barium sulfate, carbon black, as well as further heat resistent inorganic and organic pigments.

With regard to the addition of further substances which have not been mentioned here, please refer to the monographie of Helmut Kainer "Polyvinylchlorid und Vinylchlorid-Mischpolymerisate", Springer editions, Berlin, Heidelberg, New York, 1965, pages 209 to 258 and 275 to 329.

The thermoplastic composition according to the invention may be used, depending on the proportion of the chlorinated high-density polyethylenes, for making profiles, plates, sheets, injection molded parts and other shaped articles. By virtue of the homogeneity of its fine grain it may be readily processed by the dry blend technique. Mixing of the components in the plasticized state may be dispensed with. The mixture is used preferably in cases where a good transparency, processibility and resistance to atmospheric corrosion are required.

The following examples illustrate the invention.

EXAMPLE 1 and comparative Tests A and B

In a chlorination vessel 10 kg of low pressure polyethylene of a density of 0.955 and a melt flow index MFI 190/5 of 0.3 g/10 min were chlorinated in 90 l of 20% hydrochloric acid at 80° C. to a chlorine content of 28%. Subsequently, the temperature was elevated to 121.5° C. and the chlorination was continued to a final chlorine content of 39.2%. After cooling and releasing the pressure, the product was suction-filtered, washed several times, filtered and dried at 75° C. A pulverulent chlorination product with a TAC value of 13% by weight and a MCH value of 14% by weight was obtained which was used as chloropolyethylene $B_1$. In a second chlorination vessel 10 kg of low pressure polyethylene of a density of 0.96 and a melt flow index MFI 190/5 of 46 g/10 min was chlorinated in 90 l of 20% hydrochloric acid, in the presence of 0.3% by weight of silicic acid having an average particle size of 12 $\mu$m and an inner surface according to BET of 200 cm$^2$/g and 0.03% by weight of dimethylpolysiloxane having a viscosity of 1,000 centistokes, each time calculated on the quantity of polyethylene. The reaction was started at 70° C. and continued while heating to 90° C. until a chlorine content of 30% by weight had been reached. Subsequently, the product was heated to 115° C. and chlorination was continued until a final chlorine content of 40.2% by weight had been obtained. After working up as indicated above, a pulverulent chlorination product with a TAC value of 62% by weight and a MCH value of 0.6% by weight was obtained which was used as chloropolyethylene $B_2$.

For Example 1 according to the invention, 90% parts by weight of suspension PVC with a K value of 60 with 5 parts by weight of chloropolyethylene $B_1$ and 5 parts by weight of chloropolyethylene $B_2$ were processed on a roll mill at 175° C. for 10 minutes with each of the stabilizations mentioned below to give a rough sheet. Compressed plates of 1 and 4 mm thickness were prepared from the rough sheet at 180° C.; duration of compression: 5 minutes. For the determination of the transparency and scattering the plates of 1 mm were used on which the percental proportion of the light shining through and the scattering of a daylight lamp were measured. The notched impact strength $a_k$ was determined at 23° C. on test samples from the 4 mm plates according to DIN 53,453.

For the comparative tests 90 parts by weight of the same PVC with 10 parts by weight of chloropolyethylene $B_1$ (test A) or $B_2$ (test B) respectively were mixed under the same conditions as in Example 1 and processed to give compressed plates. All three polymer mixtures were admixed each time with three different stabilizers indicated below:

1. Tin stabilizer: 2 parts by weight of octyl ester of dibutyltin bisthioglycolic acid 0.5 part by weight of paraffin oil (lubricant).

2. Usual Ba/Cd stabilizer: 2 parts by weight of complex Ba/Cd-laurate
(80 parts of Ba/Cd-laurate, 12 parts of trimethylol propane, 8 parts of bisphenol A), 0.5 part by weight of diphenyl-octylphosphite, 2 parts by weight of epoxidized soybean oil, 0.3 part by weight of 2-(2'-hydroxy-5'-methylphenyl)-benzotriazole (UV absorber), 0.5 part by weight of paraffin oil.

3. Preferred stabilizer: 1 part by weight of complex Ba/Cd-laurate (as described above)
1 part by weight of complex Ba/Cd-benzoate (containing 12% of trimethylol propane and 8% of bisphenol A)
0.5 part by weight of diphenyloctylphosphite,
2 parts by weight of epoxidized soybean oil,
0.3 part by weight of 2-(2'-hydroxy-5'-methylphenyl)-benzotriazole,
0.5 part by weight of paraffin oil.

Table shows the values for transparency and scattering found with the different mixtures. Since the notched impact strength within the limit of inaccuracy does not depend on the stabilization, the value is only given for the preferred stabilization. The transparency relates to the light falling in.

TABLE 1

| Example | Stabilization Transp. % | Stabilization scattering % | Stabilization Transp. % | Stabilization scattering % | Stabilization Transp. % | Stabilization scattering % | notched impact strength tance $a_k$ mJ/cm$^2$ |
|---|---|---|---|---|---|---|---|
| 1 | 86 | 20 | 81 | 53 | 84 | 22 | 5,7 |
| A | 75 | 82 | | milky turbid | | | 13,1 |
| B | 88 | 17 | 83 | 47 | 86 | 19 | 3,3 |

The table shows that the mixture according to the invention, especially with the preferred stabilization 3, has nearly the same transparency as comparative test B (according to German Patent Specification No. 2,456,278); the notched impact resistance, however, is noticeably better. The best transparency is obtained with the tin stabilization (1). But as shown in Example 2, light resistance of the mixtures stabilized in this way is significantly worse. Compared with the Examples of German Patent Specification No. 2,456,278, where a PVC with K value 70 was used, the mixtures of the invention have an essentially better flowability, as shown in Example 3 below.

EXAMPLE 2

The light resistance of the mixture of Example 1, according to the invention containing stabilizations 1 and 3 was determined by the ®Xenotest 450 according to DIN 53,387 and in the ®Fade-o-meter.

TABLE 2

| Example | Stabilizer | Xenotest | Fade-o-meter |
|---|---|---|---|
| 1 | 3 | no discoloration after 10,000 hours | yellow-brown after 3,200 hours |
| 1 | 1 | yellow-brown after 2,000 hours | yellow-brown after 800 hours |

EXAMPLE 3

Example 1 was repeated with a S-PVC with K value of 70. In comparison with Example 1 the melt flow indices MFI 190/10 and 190/6 (DIN 53 735) were determined.

TABLE 3

| Example | MFI 190/10 | MFI 190/21.6 |
|---|---|---|
| 1 | 4 dl/g | 22 dl/g |

TABLE 3-continued

| Example | MFI 190/10 | MFI 190/21.6 |
|---|---|---|
| 3 | 0.3 dl/g | 3 dl/g |

What is claimed is:

1. Thermoplastic composition consisting essentially of
   (A) 95–80% by weight of vinyl chloride polymer and
   (B) 5–20% by weight of chlorinated polyethylenes, each time calculated on the thermoplastic composition, wherein component
      (A) is a vinyl chloride polymer with a K value of from 55–65, and component B is a mixture of
      (B$_1$) 2.5–15 parts by weight of a chlorinated low pressure polyethylene, having a chlorine content of from 37–42% by weight, a residue value of from 0–30% (measured by extraction with toluene/acetone 1:1) and a swelling value of from 10–70% (measured in methyl cyclohexane) and which has been prepared by chlorination of a low pressure polyethylene of a density of from 0.940–0.955 g/cm$^3$ and a melt flow index MFI 190/5 of from 0.1–5 g/10 min in suspension in water or in 10–35% hydrochloric acid in the presence of 0–2% by weight of silicic acid and 0–1% by weight of silicone oil, relative, each time, to the polyethylene used, at temperatures between 50° and 130° C., with at least 10% of chlorine being introduced at temperatures between 120° and 130° C. and
      (B$_2$) 2.5–15 parts by weight of a chlorinated low pressure polyethylene with a chlorine content of from 37–42% by weight, a residue value of 50–70% and a swelling value below 1% and which has been prepared from a low pressure polyethylene with a density between 0.955 and 0.965 g/cm$^3$ and a melt flow index MFI 190/5 of from 20–65 g/10 min by chlorination in suspension in water or in 10–35% hydrochloric acid in the presence of 0–2% by weight of silicic acid and 0–1% by weight of silicone oil, each time calculated on the polyethylene used, at temperatures between 50° and 120° C., while introducing at least the last 10% of chlorine at a temperature of from 110° to 120° C.

2. Thermoplastic composition according to claim 1, which additionally contains other known additives.

3. Thermoplastic composition according to claim 2, which contains as additives 2–8% by weight relative to the thermoplastic composition of a mixture of stabilizers, consisting of
   0.75–2 parts by weight of complex Ba/Cd benzoate,
   0–2 parts by weight of complex Ba/Cd-soap of a fatty acid with 12–18 carbon atoms
   0.3–1 part by weight of phenylalkyl phosphite with 8 to 12 carbon atoms in the alkyl group, 0.5-3 parts by weight of epoxidized fat
0-1 part by weight of UV-absorber and
0.5-1 part by weight of lubricant.

4. Thermoplastic composition according to any one of claims 1 to 3, wherein the amount of component (A) is 92-86% by weight and of component (B) 8-14% by weight.

5. Thermoplastic composition according to any one of claims 1 to 4, wherein the amount of components ($B_1$) and ($B_2$) is from 4-10 parts by weight each.

6. Thermoplastic composition according to any one of claims 1-5, wherein components ($B_1$) and ($B_2$) are prepared in 10 to 35% hydrochloric acid.

* * * * *